United States Patent
Wu et al.

(10) Patent No.: US 8,675,784 B1
(45) Date of Patent: Mar. 18, 2014

(54) CHANNEL ADAPTIVE SPHERE DETECTOR

(75) Inventors: Michael Wu, Palo Alto, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/397,648

(22) Filed: Feb. 15, 2012

(51) Int. Cl.
*H04L 27/08* (2006.01)

(52) U.S. Cl.
USPC .......................................................... 375/341

(58) Field of Classification Search
USPC .......................................................... 375/341
See application file for complete search history.

(56) References Cited

U.S. PATENT DOCUMENTS

| | | | |
|---|---|---|---|
| 2008/0208496 A1* | 8/2008 | Habath et al. | 702/77 |
| 2010/0067596 A1* | 3/2010 | Park et al. | 375/262 |
| 2011/0075718 A1* | 3/2011 | Liu et al. | 375/232 |
| 2012/0219097 A1* | 8/2012 | McCloud et al. | 375/341 |

* cited by examiner

*Primary Examiner* — Chieh M Fan
*Assistant Examiner* — Tanmay Shah
(74) *Attorney, Agent, or Firm* — Gerald Chan

(57) ABSTRACT

A method for detecting communications from multiple transmission antennas includes receiving a signal with at least one receive antenna, wherein the signal comprises data transmitted from at least one of the transmission antennas, calculating an equalized received signal and an equalized channel matrix using the signal and a channel matrix, determining whether a correlation factor threshold value is exceeded, and based on the act of determining, generating a listed based log likelihood ratio (LLR) soft output or a MMSE LLR soft output based on the equalized received signal and the equalized channel matrix.

19 Claims, 5 Drawing Sheets

CHANNEL ADAPTIVE SPHERE DETECTOR

FIELD OF THE INVENTION

An embodiment relates to sphere detectors. In particular, it relates to channel adaptive sphere detectors.

BACKGROUND

Currently, the technique of spatial multiplexing is utilized to improve performance for various types of communication systems. Spatial multiplexing employs multiple transmit antennas and multiple receive antennas to improve communication performance. In particular, it allows for independent and separately encoded signals to be transmitted from each of the transmit antennas.

After the signals are received by the receive antennas, various types of detectors may be used to detect the signals. Two types of detectors that are frequently used in industry are a minimum mean square error (MMSE) detector and a sphere detector. When the signals are highly correlated, a sphere detector will provide for a better bit error rate (BER) than an MMSE detector. However, sphere detectors require more calculations, more calculation time, and more power to perform detection than MMSE detectors. As such, when the signals are highly correlated, and there is no desire for conserving power, detection with sphere detectors is preferred. Therefore, there is a need for a system and method that allow for the switching between detection with a MMSE detector and detection with a sphere detector depending upon the amount of correlation of the signals.

SUMMARY

In one embodiment, a method for detecting communications from multiple transmission antennas includes receiving a signal with at least one receive antenna, wherein the signal comprises data transmitted from at least one of the transmission antennas, calculating an equalized received signal and an equalized channel matrix using the signal and a channel matrix, determining whether a correlation factor threshold value is exceeded, and based on a result of the act of determining, generating a listed based log likelihood ratio (LLR) soft output or a MMSE LLR soft output based on the equalized received signal and the equalized channel matrix.

In another embodiment, a system for detecting communications from multiple transmission antennas includes at least one receive antenna configured to receive a signal, wherein the signal comprises data transmitted from at least one of the transmission antennas, a minimum mean square error (MMSE) equalizer configured for receiving the signal and a channel matrix, and configured for outputting an equalized received signal and an equalized channel matrix, a sphere detector configured for generating an output based on the equalized receive signal and the equalized channel matrix when a correlation factor threshold value is exceeded, a listed based log likelihood ratio (LLR) generator configured for generating a listed based LLR soft output based on the output of the sphere detector when the correlation factor threshold value is exceeded, and a MMSE LLR generator configured for generating a MMSE LLR soft output based on the equalized received signal and the equalized channel matrix when the correlation factor threshold value is not exceeded.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of the scope of the claims.

DETAILED DESCRIPTION OF THE DRAWINGS

Figure 1:
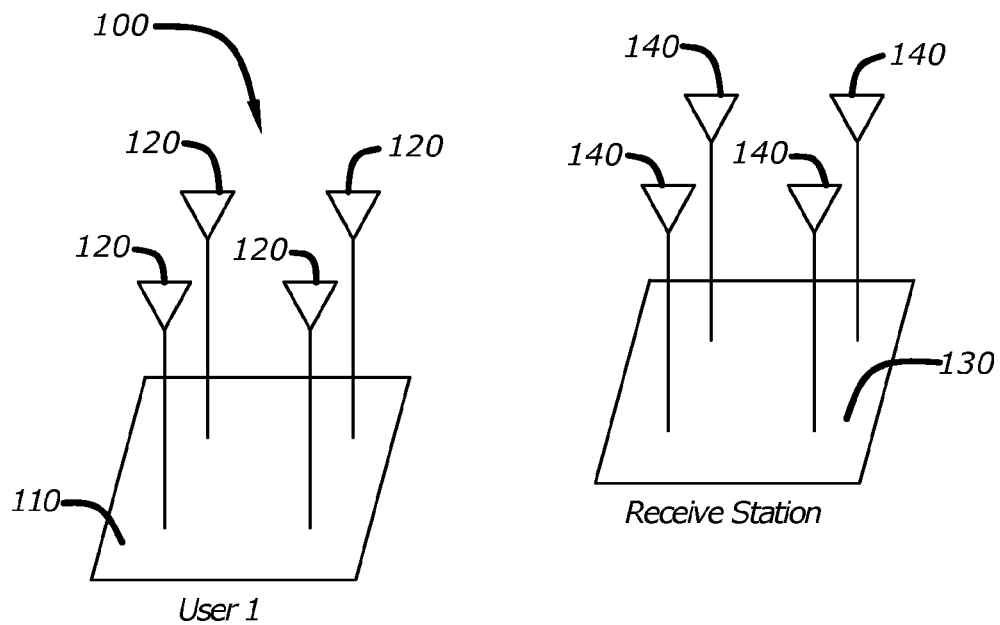
FIG. 1 is an illustration of one configuration for achieving spatial multiplexing, which employs a single user device with multiple transmit antennas, in accordance with at least one embodiment.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

One or more embodiments disclosed herein provide an operative system for channel adaptive sphere detectors. Specifically, this system relates to channel adaptive sphere detectors that optimize detection performance by adaptively applying a sphere detector in a receive source based on the degree of correlation between the spatial layers of a received spatially multiplexed signal. The degree of correlation between the spatial layers of the received spatially multiplexed signal may be determined by a number of techniques. In one or more embodiments, the different types of techniques that are used by the disclosed system to determine the degree of correlation of the signal include, but are not limited to, the condition number of the channel and information regarding whether the transmission antennas are associated with (e.g., physically located on and/or near) one or more user devices.

In the following description, numerous details are set forth in order to provide a more thorough description of the system.

It will be apparent, however, to one skilled in the art, that the disclosed system may be practiced without these specific details.

The performance of radio frequency (RF) communication systems, such as a Long Term Evolution (LTE) system, may be improved upon by spatial multiplexing several transmit data streams to the same receive station. Spatial multiplexing is a transmission technique used in multiple-input and multiple-output (MIMO) wireless communication, which uses multiple antennas at both the transmitter and receiver to improve communication performance. Spatial multiplexing may be used to transmit independent and separately encoded data signals (referred to as "streams") from each of the multiple transmit antennas. Therefore, the space dimension is reused, or multiplexed, more than one time. If the transmitter is equipped with $N_t$ antennas and the receiver has $N_r$ antennas, the maximum spatial multiplexing order (i.e. the number of streams) is $N_s = \min(N_t, N_r)$. This means that $N_s$ streams can be transmitted in parallel, ideally leading to an $N_s$ increase of the spectral efficiency (i.e. the number of bits per second and per Hertz (Hz) that can be transmitted over the wireless channel). The practical multiplexing gain may be limited by spatial correlation, which means that some of the parallel streams have similar channel gains.

Figure 2:
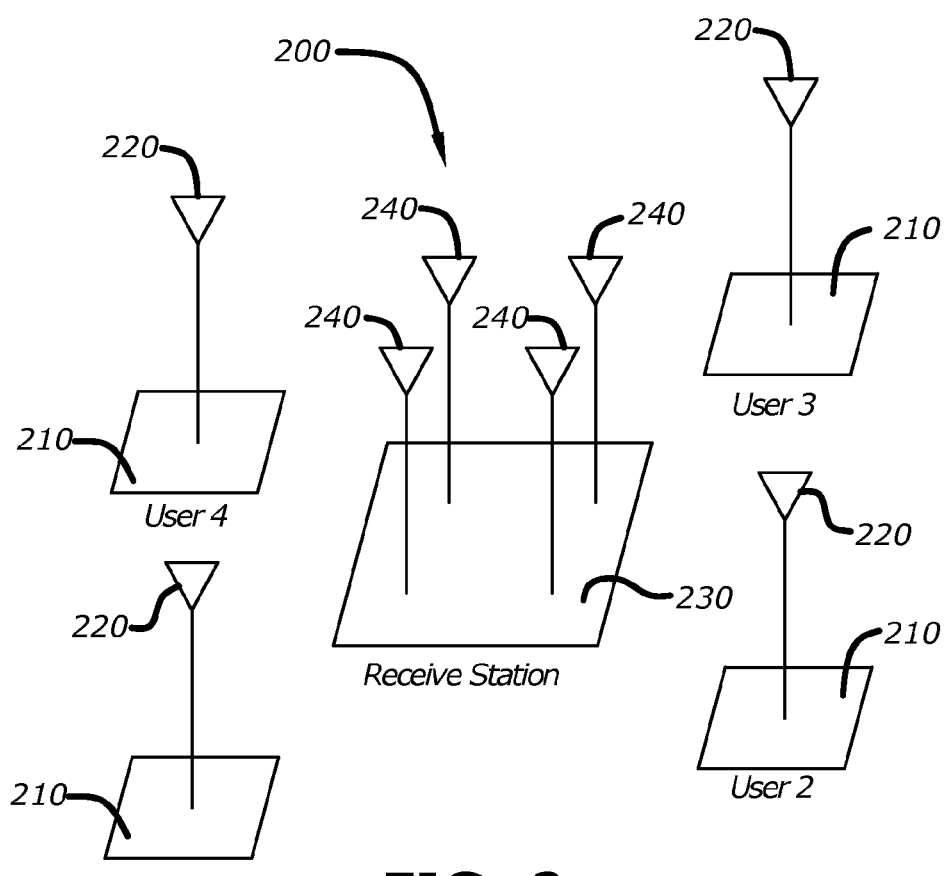
FIG. 2 is an illustration of another configuration for achieving spatial multiplexing, which employs multiple single antenna users, in accordance with at least one embodiment.

FIGS. 1 and 2 show two different configurations for accomplishing spatial multiplexing. In particular, FIG. 1 is an illustration of one configuration 100 for achieving spatial multiplexing, which employs a single user device 110 with multiple transmit antennas 120. In this figure, a single user device 110 is shown to include four transmit antennas 120. The transmit antennas 120 are transmitting a spatially multiplexed signal to four receive antennas 140 located at a receive station 130.

FIG. 2 is an illustration of another configuration 200 for achieving spatial multiplexing, which employs multiple single antenna 220 at multiple respective users 210. In this figure, four multiple user devices 210, each with a single transmit antenna 220, are transmitting a spatially multiplexed signal to four receive antennas 240 located at a receive station 230. For this configuration, when the multiple single antenna 220 transmit at the same time, they create a virtual multiple-input and multiple-output (MIMO) antenna array. It should be noted that both of these configurations may include more or less transmit antennas and/or receive antennas.

The configuration of FIG. 1 improves the throughput of a single user. However, due to the physical limitations of some user devices, the antennas on these devices are located fairly close to one another, thereby leading to significant antenna correlation at the receive station. The configuration of FIG. 2 improves aggregate throughput of the system, assuming the users are reasonably far apart and the antenna correlation is low at the receive station.

For both of these configurations, the receive station needs to combat two sources of interference, which are (1) intersymbol interference due to the frequency selective channel itself and (2) inter-antenna interference due to the spatial multiplexing. This is the case for a third generation partnership project long term evolution (3GPP LTE) uplink. However, for a downlink or worldwide interoperability for microwave access (WiMAX) that uses orthogonal frequency division multiplexing (OFDM), this is not the case, and the main concern is inter-antenna interference. To suppress these two sources of interferences, the disclosed system uses a soft-output detector, such as a minimum mean square error (MMSE) detector. A MMSE detector includes an MMSE equalizer and a soft-output generator. However, it should be noted that these two sources of interferences may not be eliminated by the MMSE detector. Assuming the intersymbol interference is not significant and the equalized channel is approximated as a flat-fading channel, the disclosed system may reduce the effect of inter-antenna interference by performing sphere detection on the output of the MMSE equalizer followed by a list-based soft-output generator.

To understand the impact of sphere detection on the performance of the system, a simulation was performed showing the bit error rate (BER) performance of a four-way (4-way) scheduled sphere detector against a soft-output MMSE detector in a moderately correlated typical urban pedestrian channel and in an uncorrelated typical urban pedestrian channel. For the simulation, the soft outputs of the two detectors were fed to a rate=1/3 third generation partnership project (3GPP) turbo decoder with K=6144, which performs eight (8) decoding iterations, where the rate (r)=K (number of info bits)/n (number transmit bits).

Figure 3:
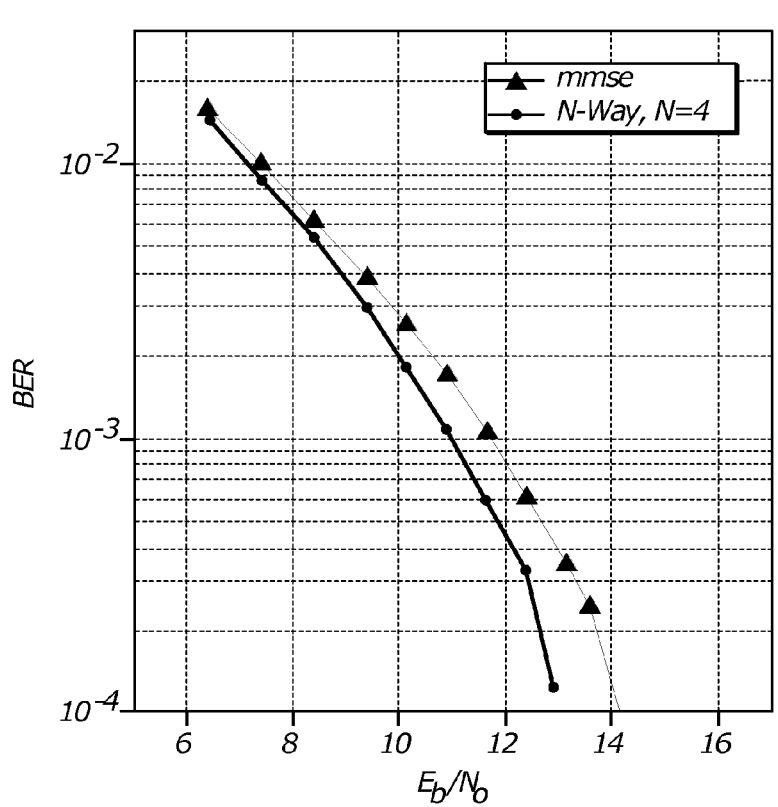
FIG. 3 is a graph showing a comparison of performance for minimum mean square error (MMSE) detection and sphere detection for an uncorrelated channel, in accordance with at least one embodiment.
Figure 4:
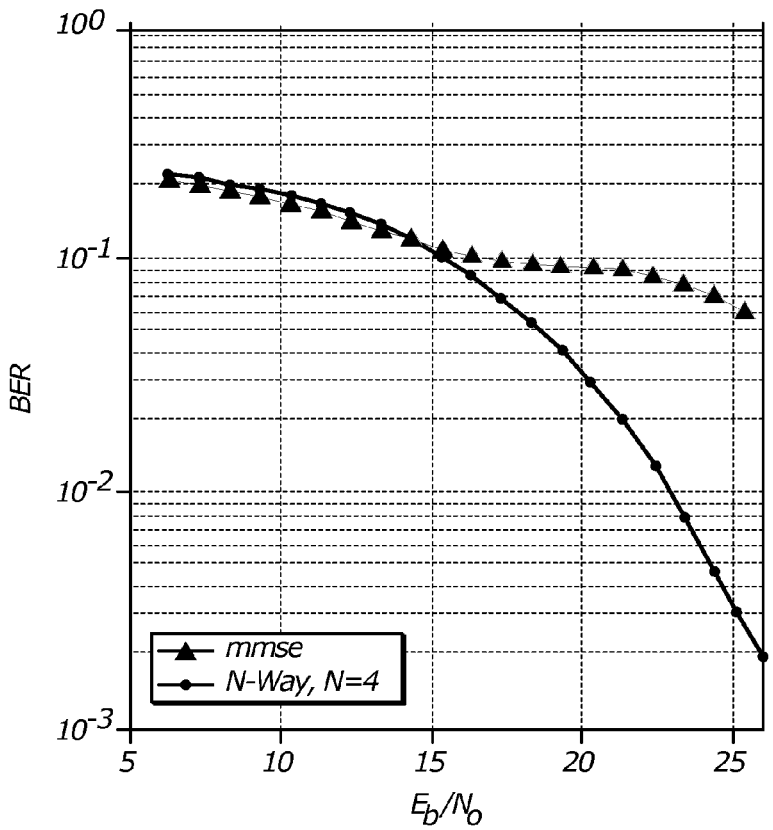
FIG. 4 is a graph showing a comparison of performance for MMSE detection and sphere detection for a correlated channel, in accordance with at least one embodiment.

FIGS. 3 and 4 show the simulation BER performance results. Specifically, FIG. 3 is a graph showing a comparison of performance for minimum mean square error (MMSE) detection and sphere detection (referred to as "4-way" on the graph) for an uncorrelated channel, and FIG. 4 is a graph showing a comparison of performance for MMSE detection and sphere detection (referred to as "4-way" on the graph) for a correlated channel. For both of these figures, the x-axis of the graphs illustrates the energy per bit to noise power spectral density ratio ($E_b/N_0$), while the y-axis of the graphs shows the BER. In FIG. 3, the results show that there is very little difference in the BER performance between the MMSE detection and the sphere detection for the uncorrelated channel. However, in FIG. 4, the results show that there is a significant reduction in BER for the sphere detection than for the MMSE detection for the correlated channel.

Figure 5:
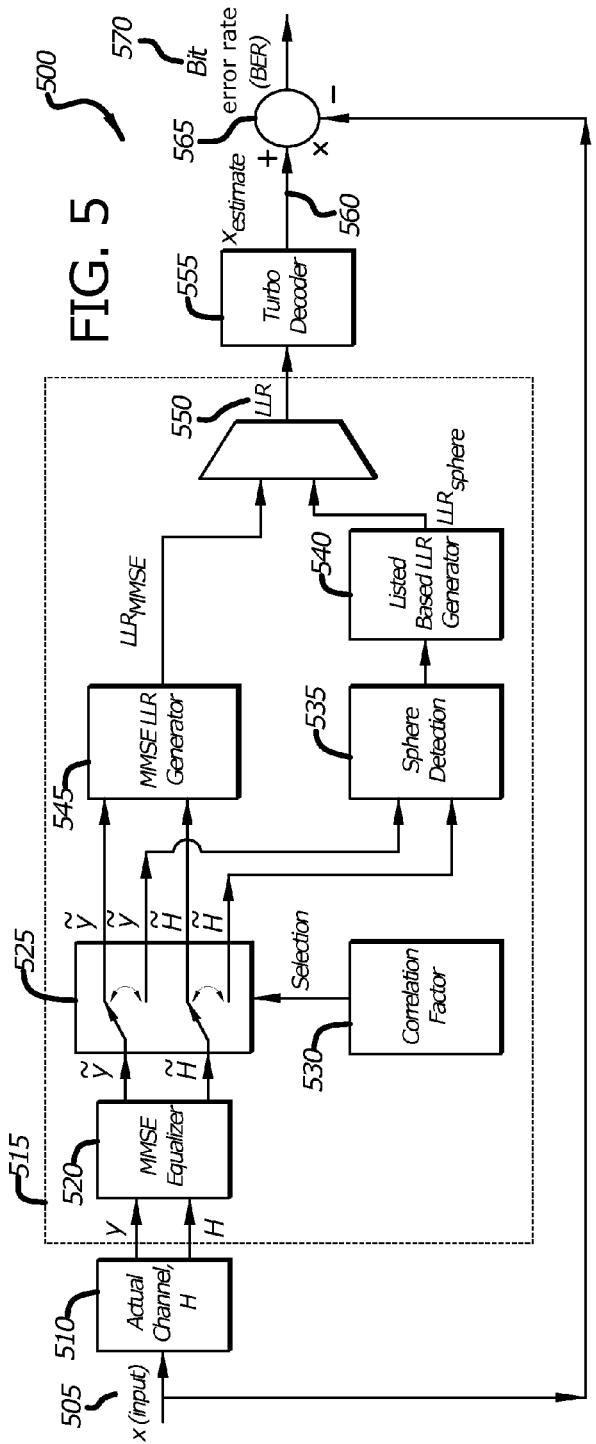
FIG. 5 illustrates an adaptive detector system using a degree of correlation for selection of a type of detection to be used, in accordance with at least one embodiment.

To reduce power consumption of the adaptive detector while maximizing its performance regardless of the channel correlation conditions, the disclosed system utilizes an adaptive design, which allows for the switching between MMSE detection and sphere detection based on the degree of correlation of the channel. FIG. 5 illustrates a design for the disclosed adaptive detector system 500 using the degree of correlation of the channel for selection of the type of detection to be used, in accordance with some embodiments. In this figure, a transmitted signal x 505 is inputted into the system 500. In one or more embodiments, the system 500 is aware of the signal's x 505 associated channel matrix H 510. However, in some embodiments, the system 500 does not have complete knowledge of the signal's x 505 associated channel matrix H 510. In these embodiments, a processor (not shown) is used to calculate an estimate of the channel matrix H 510. The processor may be a part of the system 500 in some embodiments.

Figure 6:
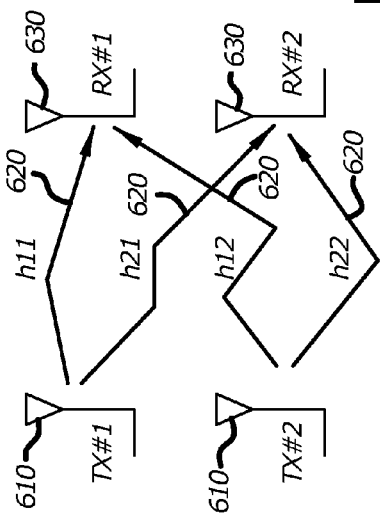
FIG. 6 depicts an example of how elements of a channel matrix H are derived, in accordance with at least one embodiment.

FIG. 6 depicts an example of how elements of the channel matrix H 510 are derived. In this figure, two transmit antennas (TX#1 and TX#2) 610 are shown to be transmitting signals 620 to two receive antennas (RX#1 and RX#2) 630. Each signal path represents a transfer characteristic (h11, h21, h12, and h22) for the channel matrix H 510. The channel matrix H 510 is an n by m (n×m) matrix, where n is equal to the number of transmit antennas 610, and m is equal to the number of receive antennas 630. As such, for the example shown in FIG. 6, the channel matrix H 510 is a 2×2 matrix containing elements h11, h21, h12, and h22.

Referring back to FIG. 5, a received signal y is received with at least one receive antenna (not shown) at a receive source (not shown). The signal y includes data transmitted from at least one transmit antenna (not shown) associated with a user device (not shown). The received signal y and the channel matrix H 510 are inputted into a minimum mean square error (MMSE) equalizer 520 of an adaptive detector 515. The MMSE equalizer 520 calculates an estimate of the signal x, which is referred to as the equalized received signal ỹ, as well as calculates an error for the estimate of the signal x. The MMSE equalizer 520 also calculates an estimate of channel matrix H 510, which is referred to as the equalized channel matrix H̃.

The equalized received signal ỹ, the error for the estimate of the signal x, and the equalized channel matrix H̃ are all inputted into a selector 525. A processor (not shown, and may be considered to be a part of the system 500 in some embodiments) then determines whether the correlation of the channel exceeds a correlation factor threshold value. There are a number of factors the processor can use to determine the degree of correlation for the channel. One factor is related to whether the transmission antennas of the signal x are associated with one or more user device. If the transmission antennas are associated with only one user device, the correlation of the channel will likely be determined by the processor to be high, and vice versa.

If the processor determines that the correlation of the channel exceeds the correlation factor threshold value, the selector 525 inputs the equalized received signal ỹ, the error for the estimate of the signal x, and the equalized channel matrix H̃ into a sphere detector for sphere detection 535. The sphere detector performs a tree-structure search to sequentially determine the most likely sequence of bits in the signal x. The output of the sphere detector is then inputted into a listed based log likelihood ratio (LLR) generator 540. The listed based LLR generator 540 assigns a probability to each bit in the sequence as to whether the bit is a zero "0" or a one "1". As such, the output of the listed based LLR generator 540 is referred to as a "soft output" or a "listed based LLR soft output".

Conversely, if the processor determines that the correlation of the channel does not exceed the correlation factor threshold value, the selector 525 inputs the equalized received signal ỹ, the error for the estimate of the signal x, and the equalized channel matrix H̃ into a MMSE LLR generator 545. Similar to the listed based LLR generator 540, the MMSE LLR generator 545 assigns a probability to each bit in the sequence as to whether the bit is a zero "0" or a one "1", and the output of the MMSE LLR generator 545 is referred to as a "soft output" or a "MMSE LLR soft output".

The soft outputs 550 of the listed based LLR generator 540 and the MMSE LLR generator 545 are then fed into a turbo decoder 555. The turbo decoder 555 translates the soft outputs 550 into a hard output bit sequence 560. The hard output bit sequence 560 is compared 565 with the original transmitted signal x 505 to determine the resulting BER 570. It should be noted that in other embodiments, the system 500 may employ different types of decoder instead of the turbo detector 555. Different types of decoders that the system 500 may use include, but are not limited to, a Viterbi decoder and a low-density parity-check (LDPC) decoder, which is also known as a Gallager decoder.

Figure 7:
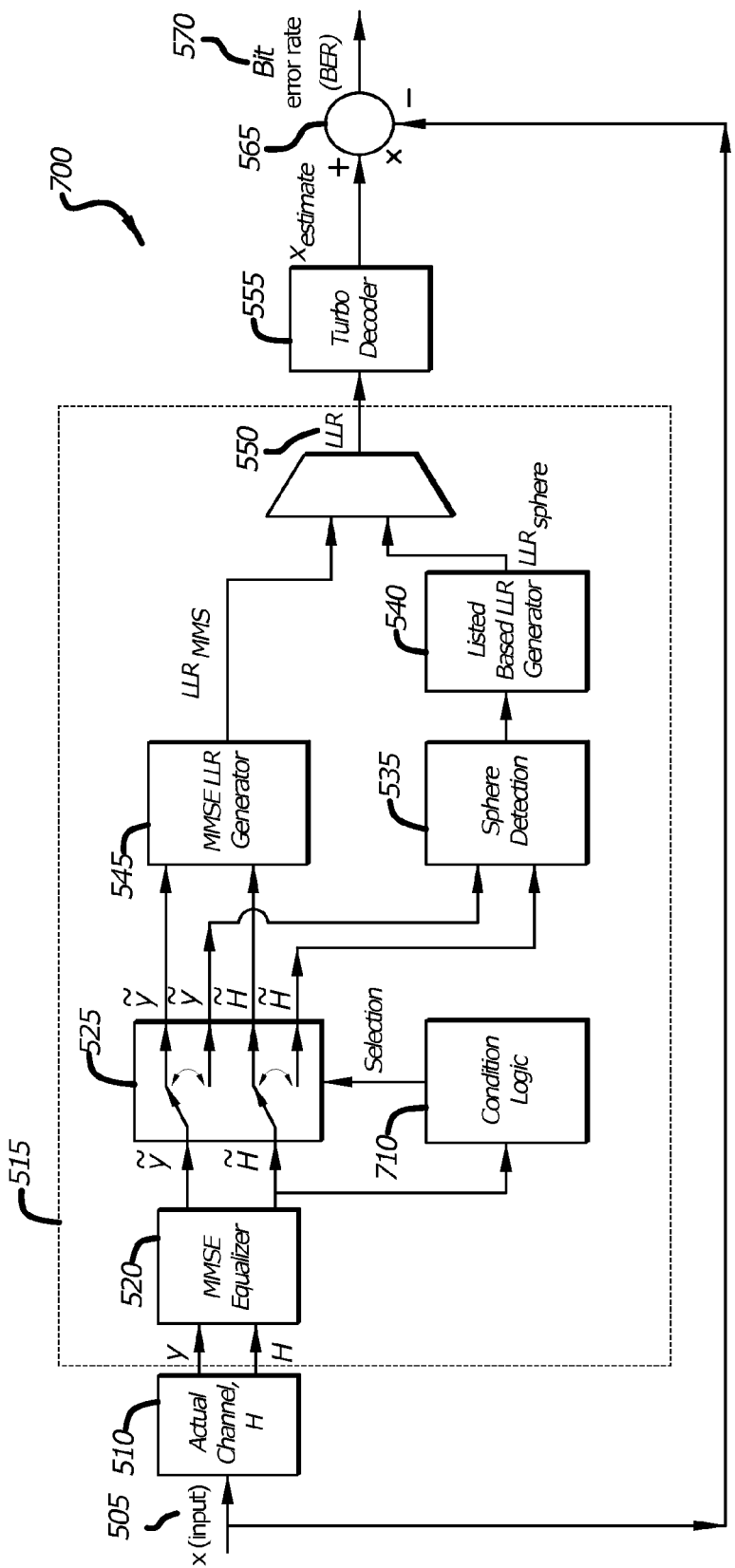
FIG. 7 illustrates an adaptive detector system using a condition number of a channel for selection of a type of detection to be used, in accordance with at least one embodiment.

FIG. 7 illustrates the disclosed adaptive detector system 700 using the condition number of the channel for selection of the type of detection to be used. The system 700 of FIG. 7 is similar to the system 500 of FIG. 5 except that the system 700 of FIG. 7 calculates a condition number in order to determine the degree of correlation for the channel. For the system 700 of FIG. 7, a processor (not shown, and may be considered to be a part of the system 700) computes the condition number for the equalized channel matrix H̃. The condition number is used to measure the degree of correlation for the channel. A high condition number indicates a highly correlated channel, and a low condition number indicates a relatively uncorrelated channel.

Figure 8:
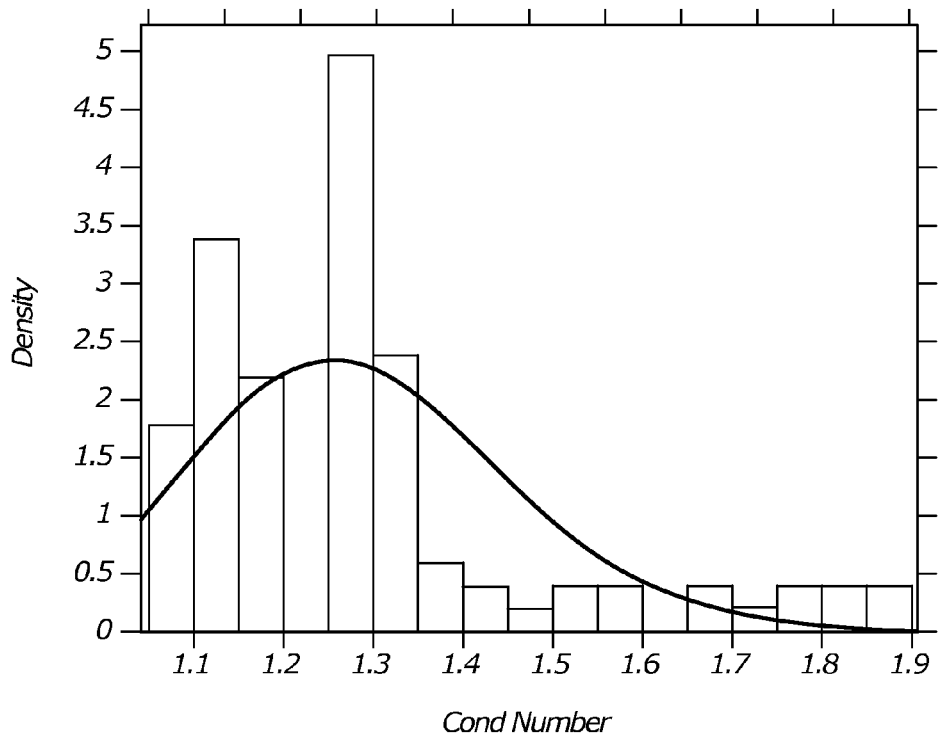
FIG. 8 is a graph showing the likelihood of condition numbers for an example of uncorrelated channel, in accordance with at least one embodiment.
Figure 9:
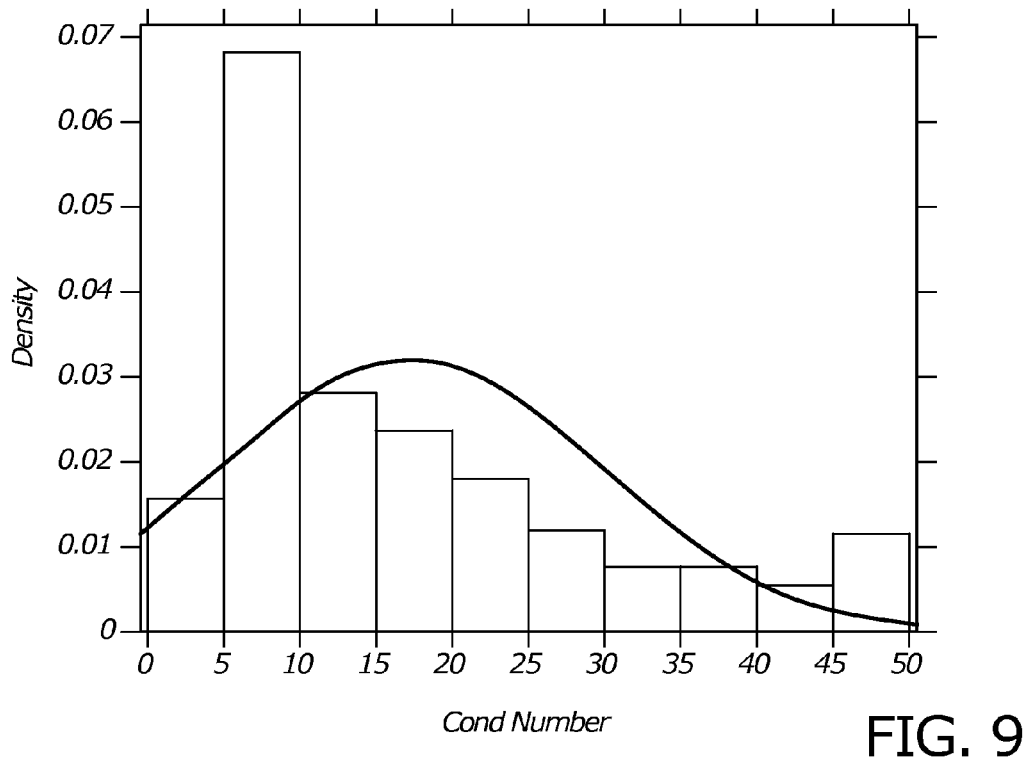
FIG. 9 is a graph showing the likelihood of condition numbers for an example of correlated channel, in accordance with at least one embodiment.

FIGS. 8 and 9 are graphs showing the likelihood of specific condition numbers for examplary channels. In particular, FIG. 8 is a graph showing the likelihood of condition numbers for an example of uncorrelated channel, and FIG. 9 is a graph showing the likelihood of condition numbers for an example of correlated channel. As evidenced by reviewing FIG. 8, typical condition numbers for an exemplary uncorrelated channel range from a little over zero to 1.9. And, upon viewing FIG. 9, it is evident that typical condition numbers for an exemplary correlated channel range from a little over zero up to 50.

Referring back to FIG. 7, once the processor determines the condition number for the equalized channel matrix H̃, condition logic 710 in the system 700 determines a corresponding degree of correlation for the channel. Similar to the system 500 of FIG. 5, for the system 700 of FIG. 7, if the processor determines that the correlation of the channel exceeds the correlation factor threshold value, the selector 525 inputs the equalized received signal ỹ, the error for the estimate of the signal x, and the equalized channel matrix H̃ into a sphere detector for sphere detection 535. Conversely, if the processor determines that the correlation of the channel does not exceed the correlation factor threshold value, the selector 525 inputs the equalized received signal ỹ, the error for the estimate of the signal x, and the equalized channel matrix H̃ into a MMSE LLR generator 545.

It should be noted that in some embodiments, the system 500 of FIG. 5 and/or the system 700 of FIG. 7 may include a power safe mode. When the systems 500, 700 employ this mode, if the power safe mode is activated, even if the processor determines that the correlation of the channel exceeds the correlation factor threshold value, the selector 525 inputs the equalized received signal ỹ, the error for the estimate of the signal x, and the equalized channel matrix H̃ into a MMSE LLR generator 545. This allows for a savings of power because sphere detection requires much more computation and power than MMSE detection.

Although particular embodiments have been shown and described, it will be understood that they are not intended to limit the claimed inventions, and it will be obvious to those skilled in the art that various changes and modifications may be made. The specification and drawings are, accordingly, to be regarded in an illustrative rather than restrictive sense. The claimed inventions are intended to cover alternatives, modifications, and equivalents.

The invention claimed is:

1. A method for detecting communications from a plurality of transmission antennas, comprising:
    receiving a signal, using at least one receive antenna, wherein the signal comprises data transmitted from at least one of the plurality of transmission antennas;
    calculating an equalized received signal and an equalized channel matrix using the signal and a channel matrix;
    determining whether a correlation factor threshold value is exceeded; and
    based on the act of determining, generating (1) a listed based log likelihood ratio (LLR) soft output based on an output from a sphere detector, or (2) a minimum mean square error (MMSE) LLR soft output based on the equalized received signal and the equalized channel matrix;
    wherein the act of generating comprises generating the listed based LLR soft output based on the output from the sphere detector if the correlation factor threshold value is exceeded, or generating the MMSE LLR soft output based on the equalized received signal and the equalized channel matrix if the correlation factor threshold value is not exceeded.

2. A method for detecting communications from a plurality of transmission antennas, comprising:
receiving a signal, using at least one receive antenna, wherein the signal comprises data transmitted from at least one of the plurality of transmission antennas;
calculating an equalized received signal and an equalized channel matrix using the signal and a channel matrix;
determining whether a correlation factor threshold value is exceeded; and
based on the act of determining, generating (1) a listed based log likelihood ratio (LLR) soft output based on an output from a sphere detector, or (2) a minimum mean square error (MMSE) LLR soft output based on the equalized received signal and the equalized channel matrix;
wherein the act of generating comprises generating the listed based LLR soft output based on the output from the sphere detector if the correlation factor threshold value is exceeded; and
wherein if the correlation factor threshold value is exceeded, the listed based LLR soft output is generated by:
performing a tree-structure search using the equalized received signal and the equalized channel matrix to determine a most likely sequence of bits in the equalized received signal; and
assigning a probability to each of the bits in the sequence.

3. The method of claim 1, wherein the transmission antennas are associated with one user device.

4. The method of claim 1, wherein the at least one receive antenna is mobile.

5. The method of claim 1, wherein the determining whether a correlation factor threshold value is exceeded comprises determining whether the correlation factor threshold value is exceeded using information regarding whether the transmission antennas are associated with one or more user devices.

6. The method of claim 1, wherein the determining whether a correlation factor threshold value is exceeded comprises computing a condition number using the equalized channel matrix.

7. The method of claim 1, further comprising:
decoding the listed based LLR soft output; or
decoding the MMSE LLR soft output.

8. The method of claim 7, wherein the decoding the listed based LLR soft output is performed using a turbo decoder, a Viterbi decoder, or a low-density parity-check (LDPC) decoder, or the decoding the MMSE LLR soft output is performed using the turbo decoder, the Viterbi decoder, or the LDPC decoder.

9. The method of claim 1, wherein the MMSE LLR soft output is generated when a power save mode is activated, even if the correlation factor threshold value is exceeded.

10. A system for detecting communications from a plurality of transmission antennas, comprising:
at least one receive antenna configured to receive a signal, wherein the signal comprises data transmitted from at least one of the plurality of transmission antennas;
a minimum mean square error (MMSE) equalizer configured to receive the signal and a channel matrix, and configured to output an equalized received signal and an equalized channel matrix;
a sphere detector configured to generate an output based on the equalized receive signal and the equalized channel matrix when a correlation factor threshold value is exceeded;
a listed based log likelihood ratio (LLR) generator configured to generate a listed based LLR soft output based on the output of the sphere detector when the correlation factor threshold value is exceeded; and
a MMSE LLR generator configured to generate a MMSE LLR soft output based on the equalized received signal and the equalized channel matrix when the correlation factor threshold value is not exceeded.

11. The system of claim 10, wherein the sphere detector is configured to perform a tree-structure search to determine a most likely sequence of bits in the equalized received signal, and assign a probability to each of the bits in the sequence.

12. The system of claim 10, wherein the transmission antennas are associated with one user device.

13. The system of claim 10, wherein at least one of the transmission antennas is mobile.

14. The system of claim 10, further comprising a processor configured to determine whether the correlation factor threshold value is exceeded.

15. The system of claim 14, wherein the processor is configured to determine whether the correlation factor threshold value is exceeded by using information regarding whether the transmission antennas are associated with one or more user devices.

16. The system of claim 14, wherein the processor is configured to determine whether the correlation factor threshold value is exceeded by computing a condition number using the equalized channel matrix.

17. The system of claim 10, further comprising a decoder configured to receive an output from the listed based LLR generator, and an output from the MMSE LLR generator.

18. The system of claim 17, wherein the decoder comprises a turbo decoder, a Viterbi decoder, or a low-density parity-check (LDPC) decoder.

19. The system of claim 10, wherein the MMSE LLR generator is configured for generating the MMSE LR soft output when a power save mode is activated, even if the correlation factor threshold value is exceeded.

* * * * *